United States Patent
Frage et al.

(10) Patent No.: US 8,142,709 B2
(45) Date of Patent: Mar. 27, 2012

(54) SINGLE-STAGE THERMAL PROCESS FOR MANUFACTURING TRANSPARENT SINTERED SPINEL

(75) Inventors: Nahum Frage, Beer-sheva (IL); Moshe Dariel, Omer (IL); Shai Meir, Beer-sheva (IL); Sergei Kalabuchov, Beer-sheva (IL)

(73) Assignee: Ben-Gurion University of the Negev Research & Development Authority, Beer-Sheva (IL)

( * ) Notice: Subject to any disclaimer, the term of this patent is extended or adjusted under 35 U.S.C. 154(b) by 392 days.

(21) Appl. No.: 12/472,524

(22) Filed: May 27, 2009

(65) Prior Publication Data

US 2009/0297851 A1 Dec. 3, 2009

(30) Foreign Application Priority Data

May 29, 2008 (IL) .......................... 191836

(51) Int. Cl.
*C01F 7/16* (2006.01)
*C04B 35/043* (2006.01)
*C04B 35/101* (2006.01)

(52) U.S. Cl. ........ 264/666; 264/667; 423/119; 423/265; 423/266; 423/275; 423/625; 423/636

(58) Field of Classification Search .................. 423/111, 423/119, 155, 265, 275, 266, 625, 635, 636; 501/108, 120, 151; 428/402; 264/666, 667
See application file for complete search history.

(56) References Cited

U.S. PATENT DOCUMENTS

| | | | | |
|---|---|---|---|---|
| 2,823,234 A * | 2/1958 | Tousignant | .................... | 564/278 |
| 3,026,210 A * | 3/1962 | Coble | .................... | 501/153 |
| 3,083,123 A * | 3/1963 | Navias | .................... | 427/162 |
| 3,155,534 A * | 11/1964 | Bruch | .................... | 117/7 |
| 3,516,839 A * | 6/1970 | Bruch | .................... | 501/153 |
| 3,531,308 A * | 9/1970 | Bagley | .................... | 501/120 |
| 3,655,330 A * | 4/1972 | Rettew et al. | .................... | 264/658 |
| 3,950,504 A * | 4/1976 | Belding et al. | .................... | 423/600 |
| 4,113,928 A * | 9/1978 | Virkar et al. | .................... | 429/320 |
| 4,273,587 A * | 6/1981 | Oda et al. | .................... | 501/153 |
| 4,543,346 A * | 9/1985 | Matsui et al. | .................... | 501/120 |
| 4,584,151 A * | 4/1986 | Matsui et al. | .................... | 264/1.21 |
| 5,001,093 A | 3/1991 | Roy et al. | | |
| 5,152,940 A * | 10/1992 | Shibata et al. | .................... | 264/1.21 |
| 5,244,849 A * | 9/1993 | Roy et al. | .................... | 501/120 |
| 5,525,561 A * | 6/1996 | Van Zyl | .................... | 501/120 |
| 6,673,731 B2 * | 1/2004 | Hahn et al. | .................... | 501/120 |

(Continued)

FOREIGN PATENT DOCUMENTS

GB 2 051 032 1/1981

OTHER PUBLICATIONS

Frage et al., J. Materials Sci., 4[9], pp. 3273-3275, 2007.

(Continued)

*Primary Examiner* — Hoa (Holly) Le
(74) *Attorney, Agent, or Firm* — Roach Brown McCarthy & Gruber, P.C.; Kevin D. McCarthy

(57) ABSTRACT

The invention provides a rapid and economical process for manufacturing a transparent, spinel based ceramic. A transparent body of sintered magnesium aluminate spinel having excellent optical and mechanical properties is provided in a single-stage thermal process.

7 Claims, 1 Drawing Sheet

U.S. PATENT DOCUMENTS 7,247,589 B2 * 7/2007 Krell et al. .................... 501/120
2005/0164867 A1 * 7/2005 Krell et al. .................... 501/120

OTHER PUBLICATIONS

Meir et al., J.Am.Ceram.Soc., 92[2], pp. 358-364, 2009.

Villalobos G R et al: "Degradation of magnesium . . . aid", J. Am. Cer. Soc., vol. 88, No. 5, May 2005, pp. 1321-1322, XP002574780.
International Search Report for corresponding PCT application—4 pages, mailed on Apr. 12, 2010.

* cited by examiner

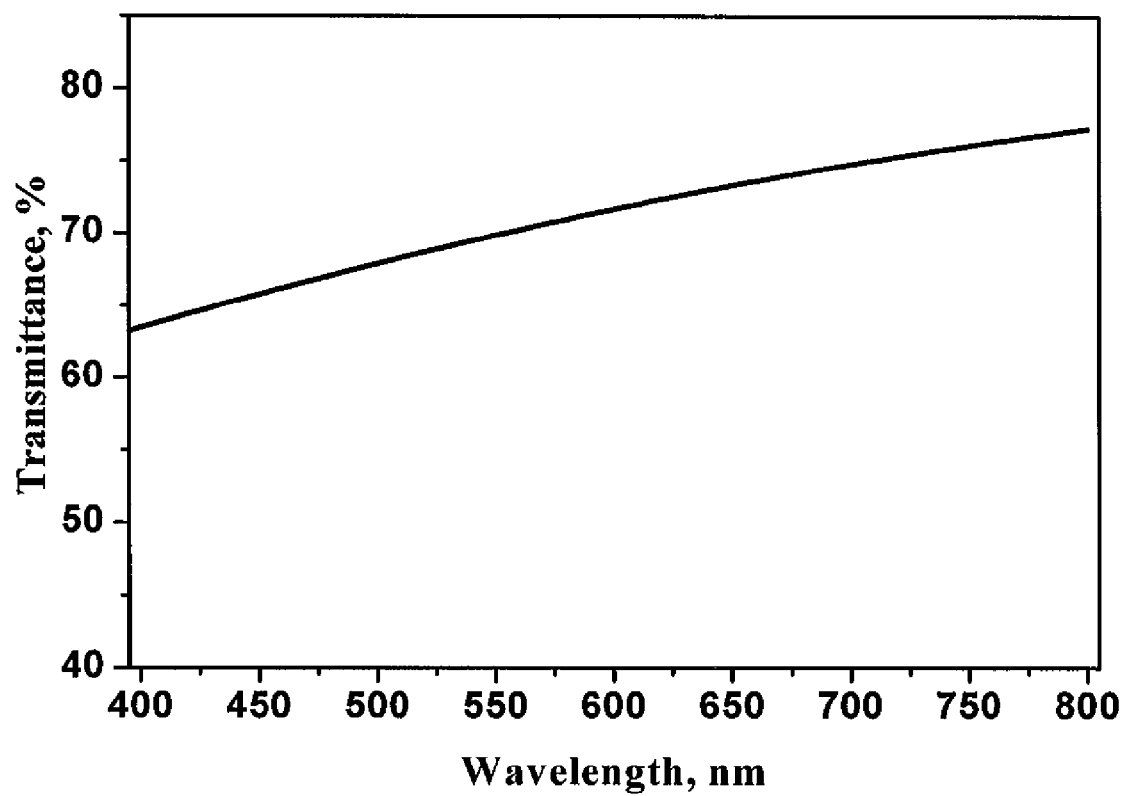

SINGLE-STAGE THERMAL PROCESS FOR MANUFACTURING TRANSPARENT SINTERED SPINEL

CROSS-REFERENCE TO RELATED APPLICATIONS

This application claims to Israeli patent application number 191836, filed on May 29, 2008.

FIELD OF THE INVENTION

The present invention relates to a rapid, cost effective method for manufacturing a transparent polycrystalline sintered ceramic based on magnesium aluminate spinel, having excellent optical and mechanical properties.

BACKGROUND OF THE INVENTION

Transparent ceramics are of great interest on account of their versatile optoelectronic properties and their potential for transparent armor related application. Foremost candidates for structural transparent ceramic armor materials are cubic aluminum oxynitride, known under the trade name AlON, cubic magnesium aluminate spinel and sapphire. The latter has a non-cubic crystal structure and is currently manufactured and used only in the form of single crystals, whereas cubic, isotropic AlON can be processed as polycrystalline materials. However, the raw material powders for AlON are expensive. Polycrystalline magnesium aluminate spinel ($MgAl_2O_4$) is currently the most promising optically transparent ceramics, exhibiting a unique combination of mechanical and optical properties. When sintering a composition containing spinel or oxide powders, the resulting sintered transparent spinel body displays an optically isotropic cubic structure, so that light scattering on the boundary surfaces of crystals is less critical. High transmittance body can be obtained by reducing the amount of pores and impurities in the polycrystalline structure.

Known methods for obtaining transparent polycrystalline sintered spinel set high demands on the raw materials, either employing organo-metal reagents or oxides of high purity and low particle size. Moreover, the known methods employ multi-stage, time and energy-consuming procedures, exhibiting complex temperature regimens. U.S. Pat. No. 4,543,346, for example, describes a transparent spinel body obtained from a mixtures of magnesium and aluminum isopropoxides by a multistage, complex process comprising keeping the body at high temperatures for twenty hours, the total process time going beyond 48 hours. U.S. Pat. No. 5,001,093 describes a spinel body obtained from magnesium and aluminum oxides of submicron size, with strictly limited impurities, some only on the level of several ppm, in a prolonged multistage process. Known methods, thus, provide transparent spinel bodies only by lengthy, complicated and costly procedures. It is therefore an object of this invention to provide a simpler method for manufacturing transparent polycrystalline sintered spinel ceramic.

It is another object of the invention to provide a method for producing transparent spinel bodies from oxide powders, without particular demands on their purity and particle size.

It is still another object of the invention to provide a relatively less time-consuming and energy-consuming process for manufacturing transparent spinel.

It is a further object of the invention to provide a method capable of providing transparent spinel bodies in desired quantities and qualities within hours, from oxide powders of commercial purity.

It is a still further object of the invention to provide a rapid method for manufacturing a transparent polycrystalline sintered spinel bodies for use in optoelectronics and in armor-related applications.

It is also an object of the invention to provide relatively inexpensive magnesium aluminate spinel which is transparent essentially in the whole visible range.

Other objects and advantages of present invention will appear as description proceeds.

SUMMARY OF THE INVENTION

The invention relates to a single-stage thermal process for manufacturing transparent sintered magnesium aluminate spinel, comprising the step of rapidly heating an equimolar mixture of magnesium oxide (MgO) and aluminum oxide ($Al_2O_3$) with a sintering additive. In a preferred embodiment of the invention, said sintering additive is lithium fluoride (LiF), added to an amount of 0.5 to 2 wt % of said mixture. The additive may be added as a powder or as a solution. The process of the invention consists of one integrated stage comprising heating the mixture at a rate of from 70 to 200° C./min. In a preferred embodiment of the invention, the single-stage process comprises heating at a rate of 80-200° C./min and reaching a temperature of 1600±20° C. The maximal temperature is preferably maintained for 10-70 min. At that temperature the oxides react to form the magnesium aluminate spinel which is yet not densified to its final density. At the maximum temperature, about 1600° C., an axial pressure is gradually applied at a rate of from 5 to 10 MPa/min, up to the maximal pressure of between 50 and 100 MPa. In a preferred embodiment of the invention, the rate of pressure increase does not exceed 8±2 MPa/min, the maximal pressure to be reached having a value of 60-100 MPa, and being held for between 45 and 120 minutes. The samples are cooled to the ambient temperature. In a preferred embodiment of the invented process, Field Assisted Sintering Technology (FAST) is employed. In a preferred process according to the invention, said transparent spinel is obtained from said oxides within the total process time of less than 6 hours, for example 3 hours.

Thus, the invention is directed to a rapid process for manufacturing a transparent body of sintered magnesium aluminate spinel, comprising in one integrated stage i) heating an equimolar mechanical mixture of MgO and $Al_2O_3$ powders with an additive of about 1 wt % LiF at a temperature-increase rate of about 100-200° C., preferably of from 70 to 200° C./min, for example 100±30°/min, up to a temperature of about 1600±20° C., maintaining the sample at that temperature for 10-70 min, for example 60±10 minutes; ii) applying gradually an axial pressure at an increase rate of from 5 to 10 MPa/min, preferably not exceeding 8±2 MPa/min, up to a maximal pressure of from 50 to 100 MPa, preferably of 80±20 MPa, for example about 80 MPa; iii) maintaining that maximal pressure and temperature for a duration of 60±10 min; and iv) cooling to ambient temperature, preferably at a controlled rate of 20±5° C./min down to 1000±50° C. and then by natural cooling to the ambient temperature.

Said MgO and $Al_2O_3$ powders may have an average grain size for example about 5 μm or lower, such as from 0.2 to 2 μm. The instant process is able to provide a transparent spinel-based body even from commercial purity MgO and $Al_2O_3$ powders.

The invention provides a transparent spinel body, consisting essentially of polycrystalline sintered magnesium aluminate spinel exhibiting a relative density of at least 99.9%, with essentially zero amount of residual LiF, exhibiting a transmittance of at least 55% at a light wavelength of from 0.4 to 2 μm. In a preferred embodiment of the invention, the transparent spinel body exhibits a transmittance of at least 60% at any wavelength between 0.4 and 1 μm, and preferably exhibits a transmittance of at least 75% at a light wavelength selected between 0.4 and 0.8 μm.

The spinel-based material of the invention exhibits a Vickers hardness HV12 of at least 13 GPa, preferably greater than 14 GPa; it exhibits a Young modulus of at least 270 GPa, preferably greater than 290 GPa; it exhibits a flexural strength of at least 100 MPa, preferably greater than 130 MPa. In said body nearly no traces of said sintering additive are detectable, and the body is free of carbon inclusions.

BRIEF DESCRIPTION OF THE DRAWING

The above and other characteristics and advantages of the invention will be more readily apparent through the following examples, and with reference to the appended drawing, wherein:

FIG. 1. is the transmittance of a 2.1 mm thick spinel specimen according to the invention as a function of the wavelength in the optical region of the spectrum.

DETAILED DESCRIPTION OF THE INVENTION

The present invention puts forward changes in the processing approach that result in a reduced fabrication cost, complexity, and processing time. It was found surprisingly that transparent polycrystalline sintered magnesium-aluminate spinel ceramic, displaying almost full density and very high light transmission level, can be obtained from commercial oxide powders in a one-heating-step process. Field Assisted Sintering Technology (FAST) was applied in processing magnesium and aluminum oxides, mixed with lithium fluoride, in a process employing a simple but unexpectedly efficient temperature regimen, while obtaining sintered spinel materials having high transparency in the whole range of visible light (see, for example, FIG. 1). All the required effects, converting the oxides powder to a transparent body, were integrated essentially into a single-thermal treatment process, saving time and energy. In contrast to known processes used for manufacturing transparent sintered spinel ceramics, via more complex techniques, using at least two different two processes. The herewith described approach is capable to provide by one heating process a transparent spinel body out of two oxides.

In one aspect of the invention, a transparent polycrystalline sintered spinel is produced from a binary mechanical mixture comprising oxide powders displaying less than 5 micrometer size. Said polycrystalline sintered body is produced in a one-step thermal process using Field Assisted Sintering Technology (FAST). No traces of either the sintering aid (added to accelerate the densification process) or carbon inclusions were detectable in the product obtained in the novel process.

In the present invention, a composition comprising conventional MgO and $Al_2O_3$ powders are thoroughly mixed in a 1:1 molar ratio in the presence of 0.5 to 2.0 wt % of LiF additive, for example 1 wt %. The additive may be added in powder form or as an aqueous solution. The powder is inserted in the graphite die of the FAST apparatus described herewith. The thermal processing makes use of the FAST. The present technology relies on the concomitant application of elevated temperature, axial pressure, and passage of very intense direct or pulsed electrical current, importantly combined with a quick temperature increase. The powder sample is enclosed in a graphite die. The heat released by the current raises the temperature in the graphite dies enclosing the sample, and/or within samples that display some electrical conductivity. It has been alleged but not proved that when a pulsed current is applied, plasma generation may occur between the powder particles that may involve surface activation and promote consolidation. Whatever the exact mechanism, sintering is promoted and full densification achieved at lower temperatures and within shorter time than in a conventional sintering process.

Known processes usually employ heating regimens comprising temperatures 1700° C. and higher. When employing lower temperatures, dense samples may be sometimes obtained but with no or low transparency. The present invention comprises a maximal temperature of only about 1600° C. Ambient atmosphere is removed from the heating chamber and replaced by Ar before the onset of heating and a dynamic vacuum of $10^{-2}$ torr is maintained during the heat treatment. As mentioned previously, the graphite die containing the sample also acts as the heating element. Thus the FAST atmosphere contains, beside Ar, also carbon oxides $CO/CO_2$ which are formed during the interaction of carbon with the residual oxygen. The reversible reaction:

$$2CO = C + CO_2 \qquad (1)$$

takes place in the later stages of the densification process. The reaction (Eq. 1) is endothermic, shifts to the left with increasing temperature and to the opposite direction with increasing total pressure of the gaseous components. It is supposed that when spinel, undergoing densification under the Ar—CO—CO2 atmosphere reaches about 80% relative density, the pressure within the closing pores starts to increase at a relatively low temperature. With further consolidation, the volume of the pores decreases significantly with concomitant increase of the total pressure within the pores. Following the reaction shown in Eq.1, carbon starts to precipitate in LiF-free spinel, most likely on the free surface of the pores. The precipitation of free carbon on the free surface of the pore system is probably further enhanced by the high current, and by plasma-induced reactions that take place at the spinel inner and external free surfaces within the FAST apparatus. The precipitation of carbon stands behind the gray color of the specimens and the formation of dark spots. The lack of optical transmittance according to the above assumption is linked to the carbon precipitation from the residual gaseous atmosphere, containing carbon species.

Sessile drop experiments have shown that the wetting angle of liquid LiF on the spinel substrate is close to zero and leads to full spreading of the molten phase. Sessile drop experiments, called wetting experiments, enable to determine the extent of wetting a solid by the liquid. The criterion is the so-called wetting angle, which when <90 deg. indicates that wetting may take place. Moreover, liquid LiF also wets and actually cleans spinel surfaces coated with a thin carbon deposit. Thus, liquid LiF may easily infiltrate the porous spinel preformed and spread completely over the pore surfaces. The beneficial effect of the LiF additive on the transparency of spinel is due to its propensity to fully cover the free spinel surfaces in the pore system as long as the latter is still open. The LiF additive melts at about 850° C. and, therefore, it is imperative to avoid closing the pores at that temperature. This is achieved by the high heating rate 100±30° C./min in the FAST apparatus. Liquid LiF easily infiltrates the porous spinel preform and spreads over the pore surfaces, even surfaces contaminated with carbon. At higher temperature, extensive LiF evaporation takes place in the 1100-1200° C. range and the partial pressure of the gaseous LiF dwarfs that of the residual carbon containing gases and expels the latter, thereby eliminating the source of carbon precipitation. Finally, on account of its high vapor pressure, LiF also evaporates in the course of last stages of the densification process, leaving a gas-free pore network free of any carbon containing residues and resulting in a nearly fully dense, carbon-free and LiF-free, spinel. Pressure is applied gradually starting at when the temperature reaches 1600±20° C., and leads to full densification of the spinel perform.

After appropriate and conventional polishing procedures, the discs display good transparency values for a thickness up to 5 mm. The present invention provides a method of producing a polycrystalline transparent spinel sintered body (hereafter transparent spinel body) comprising essentially a one-step thermal processing of a mixture of magnesium oxide (MgO) and aluminum oxide ($Al_2O_3$) powders supplemented by a sintering additive, wherein said powders may have a grain size in a wide range, for example, from 0.2 to 2 μm was used for MgO, and from 0.3 to 0.7 μm for $Al_2O_3$. and wherein lithium fluoride (LiF) is used as sintering additive. LiF is preferably added in an amount of 0.5 to 2 wt % and most preferably at an amount of 1 wt %, as a powder, liquid or a distinct layer of said mixture. The axial pressure in a preferred arrangement is applied gradually, starting from the ambient pressure, after reaching a temperature of about 1600±20° C.; the pressure should reach at least 50 MPa, for example 80 MPa, at a preferable rate of 8±2 MPa/min. After a holding time of about 60 min at the maximal temperature and maximal pressure, the samples are cooled to the ambient temperature.

The invention will be further described and illustrated in the following examples.

EXAMPLES

Example 1

A transparent magnesia-aluminate spinel sintered body, was fabricated and its properties tested. The body was manufactured using a mixture of commercially available alumina magnesia powders. The alumina powder had less then 10 parts per million by weight of oxides of any of the following elements Na, Si, Fe, Ca, Mg, Ga, Cr, Ni, Ti, Cu, Zn, Zr. The alumina powder had an average 0.5 micrometer grain size and 8 m²/g surface area. The magnesia powder contained less the 2500 parts per million of Na, less then 100 parts per million of Cl and Ca, and less then 10 parts per million of $NO_3$, $SO_4$, N, Pb, As, Cu, Fe, K, Mn, Zn, Ba and Sr. The magnesia powder consisted of 5 micrometers size agglomerates of smaller particles and 40 m²/g surface area. A molar ratio of 1:1 of the said magnesia and alumina were mixed in a polypropylene container using a vibration mixer with no spheres. Sintering additive, 1 wt % LiF, was added while mixing with the oxide premixture.

The powder was loaded into a graphite die of the said SPS apparatus and was cold pressed at 8 MPa in the apparatus itself. The temperature was raised to 400° C. for 5 minutes (as required by the standard operation of the SPS apparatus), and then raised to 1600° C. at a rate of 100° C./min. After 10 minutes of holding at 1600° C. the pressure was slowly raised to 80 MPa. The total "soak" time at 1600° C. was two hours. After cooling, the body was polished by grinding on increasingly fine SiC papers followed by polishing with diamond-paste, in order to achieve the least amount of reflectance due to surface roughness.

Example 2

The same powder and the same mixture procedures, as described in Example 1, were used. Next, the powder was loaded into a graphite die of the said SPS apparatus and was cold pressed at 6 MPa in the apparatus itself. The temperature was raised to 400° C. for 5 minutes (as required by the standard operation of the SPS apparatus), and then raised to 1600° C. at a rate of 100° C./min. After the temperature had reached 1600° C. the applied pressure was slowly raised to 80 MPa at a rate of 5 MPa/min. The total "soak" time at 1600° C. was 60 minutes. After cooling, the sample was polished by applying an initial grinding stage of SiC on increasingly fine SiC papers followed by polishing with diamond-paste, in order to achieve the least amount of reflectance due to surface roughness.

While this invention has been described in terms of some specific examples, many modifications and variations are possible. It is therefore understood that within the scope of the appended claims, the invention may be realized otherwise than as specifically described.

The invention claimed is:

1. A rapid process for manufacturing a transparent body of sintered magnesium aluminate spinel, comprising in one integrated stage
   i) heating an approximately equimolar mixture of MgO and $Al_2O_3$ powders with an additive of about 0.5 to 2 wt % LiF at a temperature-increase rate of from 70 to 200° C. up to a maximal temperature of about 1600° C.;
   ii) applying, at said maximal temperature of about 1600° C., a gradually increasing axial pressure at a rate of from 5 to 10 MPa/min, up to a maximal pressure of between 50 and 100 MPa; and
   iii) maintaining said maximal temperature and said maximal pressure for from 0.75 to 2 hours, followed by cooling to ambient temperature.

2. A process according to claim 1, wherein said MgO and $Al_2O_3$ powders have an average grain size not greater than 5 μm.

3. A process according to claim 1, wherein said LiF is added to said mixture in an amount of 1 wt % of said mixture.

4. A process according to claim 1, wherein said LiF is added as a powder or as a solution.

5. A process according to claim 1, comprising heating said mixture at a temperature-increase rate of at least 80° C./min up to a maximal temperature of about 1600° C., applying gradually an axial pressure to reach 50 to 100 MPa at about 1600° C. at a rate that does not exceed 8±2 MPa/min, and maintaining the maximal temperature and pressure for 1 hour.

6. A process according to claim 1, comprising Field Assisted Sintering Technology (FAST).

7. A process according to claim 1, wherein said transparent spinel is obtained from said oxides within the total process time of less than 6 hours.

* * * * *